US012521960B2

(12) United States Patent
Lang et al.

(10) Patent No.: US 12,521,960 B2
(45) Date of Patent: Jan. 13, 2026

(54) METHOD FOR PRODUCING A CONTROLLED TEAR-OPEN AND/OR TEAR-OFF AID FOR FIBER-BASED WEB MATERIAL

(71) Applicant: INTERLAS GMBH & CO. KG, Ummendorf (DE)

(72) Inventors: Bernhard Lang, Ummendorf (DE); Christian Lang, Ummendorf (DE); Patricia Hermann, Ummendorf (DE)

(73) Assignee: INTERLAS GMBH & CO. KG, Ummendorf (DE)

( * ) Notice: Subject to any disclaimer, the term of this patent is extended or adjusted under 35 U.S.C. 154(b) by 0 days.

(21) Appl. No.: 19/036,256

(22) Filed: Jan. 24, 2025

(65) Prior Publication Data

US 2025/0196464 A1 Jun. 19, 2025

Related U.S. Application Data

(63) Continuation of application No. PCT/EP2023/062821, filed on May 12, 2023.

(30) Foreign Application Priority Data

Jul. 27, 2022 (DE) ..................... 10 2022 118 886.8

(51) Int. Cl.

*D21H 27/30* (2006.01)
*B31F 1/08* (2006.01)
*B65D 5/54* (2006.01)
*D21H 19/00* (2006.01)

(52) U.S. Cl.

CPC .................. *B31F 1/08* (2013.01); *B65D 5/54* (2013.01); *D21H 19/00* (2013.01); *D21H 27/30* (2013.01)

(58) Field of Classification Search

CPC ............................... D21H 27/30; D21H 19/00
USPC ........................................................ 264/400
See application file for complete search history.

(56) References Cited

U.S. PATENT DOCUMENTS 3,905,646 A * 9/1975 Brackmann ............ B65D 5/685 229/149
2002/0068668 A1 6/2002 Chow et al.
2010/0029455 A1* 2/2010 Skopek .................. B31B 70/00 493/224

FOREIGN PATENT DOCUMENTS

EP 2 117 821 B1 10/2010
EP 2 390 196 A1 11/2011
EP 3 323 748 A1 5/2018
WO 99/02352 A1 1/1999

(Continued)

OTHER PUBLICATIONS

International Preliminary Examination Report (with Chapter II Claims) (Application No. PCT/EP2023/062821) dated Oct. 17, 2024 (with English translation) (27 pages).

(Continued)

*Primary Examiner* — Jacob T Minskey
(74) *Attorney, Agent, or Firm* — BURR PATENT LAW, PLLC

(57) ABSTRACT

The present invention relates to a method for producing a guided tear-open and/or tear-off aid for paper and/or other fiber-based web materials. The present invention is distinguished in that the material of the paper and/or other fiber-based web material for producing a scoring line is partially subtracted along the guided tear-open and/or tear-off aid to be produced thereon at least from one web side.

9 Claims, 3 Drawing Sheets

(56) References Cited

FOREIGN PATENT DOCUMENTS

WO 2019/089107 A1 5/2019

OTHER PUBLICATIONS

German Office Action (Application No. 10 2022 118 886.8) dated May 3, 2023 (9 pages).
International Search Report and Written Opinion (Application No. PCT/EP2023/062821) dated Sep. 5, 2023 (13 pages).

* cited by examiner

METHOD FOR PRODUCING A CONTROLLED TEAR-OPEN AND/OR TEAR-OFF AID FOR FIBER-BASED WEB MATERIAL

CROSS REFERENCE TO RELATED APPLICATIONS

This application is a continuation of International Application No. PCT/EP2023/062821 filed May 12, 2023, which designated the United States, and claims the benefit under 35 USC § 119(a)-(d) of German Application No. 10 2022 118 886.8 filed Jul. 27, 2022, the entireties of which are incorporated herein by reference.

FIELD OF THE INVENTION

The present invention relates to a method for producing a guided tear-open and/or tear-off aid for fiber-based web materials, as well as to a fiber-based web material.

BACKGROUND OF THE INVENTION

Technical aids for tearing open or tearing off paper or other fiber-based web materials such as, for example, perforating or slitting paper (spiral pads, entry tickets with a tear-off line) are known.

EP 2 390 196 A1 discloses a “tear-open device for a (packaging) blank”. This packaging blank is produced from folding material. Paper, cardboard, in particular, corrugated cardboard, or other semi-stiff materials which may also include textile materials or plastics materials, are disclosed as potential materials.

Processing the basic structure of a fiber-based material web is neither discussed nor suggested in any other way or even disclosed in EP 2 390 196 A1.

In contrast, therein for forming the tear-open device, weakening lines are applied/formed on the corrugated cardboard in such a way that a first scoring line/score is formed on an external layer of the blank formed of corrugated cardboard in the form that the material of the latter is completely severed, preferably in such a way that the intermediate layer is also partially or even completely severed. The second scoring line/score is correspondingly formed on the internal layer.

In order to also actually sever the intermediate layer, EP 2 390 196 A1 teaches that the scores are to be formed on that location of the external layer and/or internal layer of the corrugated cardboard where these layers are in each case connected to a peak of the corrugation.

As an alternative to a complete severance of the respective layer of the corrugated cardboard to be carried out over the entire length of the score, according to EP 2 390 196 A1 perforations (again in the form of complete severances of the respective layer) can also be formed, the intention being that connecting webs/web pieces remain between said perforations.

U.S. Pat. No. 3,905,646 discloses a cardboard blank as the basis from which to proceed for producing a reusable packaging structure in the form of a box comprising a lid with folding and tear-open lines and an inward-folding tab.

The tear-open lines are described as a pair of tear-open lines which are laterally tightly spaced apart and are in each case formed from the opposite side in one of two or a plurality of cardboard layers which are combined so as to form a laminate structure, wherein the tear-open lines each completely sever the cardboard layers.

EP 3 323 748 A1 discloses the production of a beverage packaging which is combined using a plurality of plies of different material layers so as to form a laminate structure, having a screw closure implemented in the laminate structure.

US 2002/0068668 A1 discloses a method for producing a tight packaging container from a single-layer or multi-layer flexible material, having a tear-open aid with is produced by partial subtraction of material by means of a LASER.

Despite a very minimal material thickness, this tear-open aid is to weaken the extremely tear-resistant material in a targeted manner so that the packaging container can be opened in the first place.

For this purpose, the parameters of the material, a subtraction depth which is less than the material thickness, and the desired pattern with the starting point for the tear-open line of the packaging container have to be entered in a software for the LASER.

WO 2019/089107 A1 discloses a packaging structure made from a flexible material having a reclosable, manipulation-proof closure.

SUMMARY OF THE INVENTION

The present invention is now based on the object of providing a possibility for producing a guided tear-open and/or tear-off aid for paper or other fiber-based web materials, which on the one hand leaves the paper or the fiber-based web material on the guided tear-open and/or tear-off aid for packaged goods to be packaged therein, e.g. liquid, in powder form, and/or for aromas of the packaged goods, such as tobacco products, impermeable to the outside as well as to aromas that predominate outside of a packaging to be produced with them in terms of penetration to the inside, and on the other hand causes a clean tearing edge.

Accordingly, the present invention relates to a method for producing a guided tear-open and/or tear-off aid for fiber-based web materials, characterized by:

- providing the other fiber-based web material, with ≥two fiber layers,
- producing at least two scoring lines in at least one planar side of the fiber-based web material in such a way that the scoring line severs at least one fiber layer and the scoring lines from both sides are in each case so deep that they cover the total thickness of the fiber-based web materials so that all transverse fibers of the paper are separated and not cut by the local separation.

For this purpose, the material of the paper and/or the fiber-based web material for producing a scoring line can be partially subtracted along the guided tear-open and/or tear-off aid to be produced thereon at least from one planar side of the paper and/or the fiber-based web material.

Due to this only partial subtraction of material in terms of the total material thickness, the sometimes quite long fibers in this region of the material web are completely severed. This destroys an interlocking composite effect along the fibers in the direction of the fibers existing up to this point.

With a correspondingly strong pulling action on the scoring line, the paper and/or the other fiber-based web material tears, wherein no power transmission from one side of the paper and/or the other fiber-based web material to the other side can take place in this subtracted region. This causes the paper and/or other fiber-based web material to tear off with a clean edge in the region of the scoring line. Shear forces can also act when opening a packaging in the form of a pouch, for example. This means that if a pouch is torn open at the top, it is not torn in line with the tensile force, but instead and/or also transversely, or in the direction of the tear-open line.

On the other hand, the paper and/or the fiber-based other web material remains tight, so that no aromas and or packaged goods can escape or invade.

According to a preferred embodiment, the material of the paper and/or the fiber-based web material for producing in each case one scoring line can be partially subtracted along the guided tear-open and/or tear-off aid to be produced thereon from both planar sides of the paper and/or the fiber-based web material.

This is preferably carried out in the cross section of the paper and/or the other fiber-based web material on regions which are slightly offset from one another, so that a sufficiently tear-resistant material transition remains in the cross section of the paper/of the web material between the regions subtracted from both planar sides of the paper and/or the fiber-based web material, even if both subtracted regions are in total equal to or even greater than the total thickness of the paper and/or the other fiber-based web material.

As a result, it can be ensured that, due to the overlap of the subtracted regions in terms of the web cross section, a sufficient tensile stability remains in the paper and/or the other fiber-based web material, despite the guaranteed severing of the fibers in the paper and/or the other fiber-based web material.

Particularly preferably, the material of the paper and/or the other fiber-based web material for producing two adjacently extending scoring lines can be partially subtracted along the guided tear-open and/or tear-off aid to be produced thereon from one web side.

The material of the paper and/or the other fiber-based web material for producing two adjacently extending scoring lines is preferably partially subtracted along the guided tear-open and/or tear-off aid to be produced thereon from a planar side of the paper and/or the fiber-based web material.

Preferably, the two scoring lines of the one planar side of the paper and/or the fiber-based web material are formed so as to be approximately parallel to one another.

The spacing between the two scoring lines on the one planar side of the paper and/or the fiber-based web material are preferably formed in a region with twice to ten times the scoring line width, particularly, preferably in a region with three to five times the scoring line width.

The one scoring line on the one planar side of the paper and/or the fiber-based web material is formed so as to lie opposite and between the two scoring lines extending in the other planar side of the paper and/or the fiber-based web material. As a result, an (offset) excess depth in terms of the material thickness of the paper and/or the other fiber-based web material, as well as an ideally fiber-free tear-open and/or tear-off edge as a function of the spacing of the subtraction regions, can be implemented.

If the paper and/or the other fiber-based web material has a coating on one side, the single scoring line which is to be formed opposite the two scoring lines to be formed on a planar side of the paper and/or the fiber-based web material, is preferably formed on the coated side, and/or the side to be coated after scoring, of the paper and/or the other fiber-based web material.

The subsequent coating to be applied after scoring, which is preferably liquid-tight, in particular, even gas-tight, causes an additional expansion of the field of application of packaging materials scored in such a way.

The added scoring line depth of two scoring lines lying opposite and offset from one another is formed in the range of the material thickness, preferably so as to be equal to or greater than the thickness of the paper and/or the other fiber-based web material.

The range of the required scoring line depth depends in particular on the tearing properties of the fibers of the material used. In a material that tears comparatively easily, e.g. short-fiber material, an additive total scoring depth in the cross section of the web material of, for example, 75% to 90% of the material thickness of the paper and/or the other fiber-based web material can be sufficient to cause a sufficiently clean tearing edge when applying a corresponding tearing force.

In the case of materials made of comparatively more resistant and/or longer fibers, on the other hand, a larger overall additive scoring depth may be required to produce a good/clean tearing edge, as described above for example.

It is important that scoring is performed from both sides, preferably at a small local spacing. In the case of the overlap, this may be understood in a broader meaning, so that the scoring depths are in the range of the material thickness, preferably greater than or equal to the material thickness.

The scoring lines can be produced by a LASER.

The present invention also relates to a device for producing a guided tear-open and/or tear-off aid for paper and/or other fiber-based web materials. The present invention is distinguished in that the device is designed to carry out a method as described above.

Furthermore, the present invention relates to a paper and/or another fiber-based web material, in particular, a packaging material, with a guided tear-open and/or tear-off aid for the paper and/or the other fiber-based web material, obtainable by one of the methods described above.

In the following, the present invention will be described again hereunder in other words.

In order to be able to tear open or tear off paper and/or other fiber-based web materials more easily, it is known to incorporate tear lines into the respective material. For example, to make it easier to open packaging.

According to the present invention, a so-called "easy opening" method is proposed. In the method, the fiber layers of the paper and/or the fiber-based web material are weakened in a targeted manner from preferably both sides and thus then serve as a tear-open aid with a clean tearing edge profile. This can be performed using a laser, for example.

In comparison to other methods, such as perforating or slitting paper (spiral pads, entry tickets with a tear-off line, etc.), the material is only subtracted and not severed in this method.

In this way, products in liquid form, in powder form or else tobacco products or other taste-sensitive products can also be packaged.

In the case of liquid packaged goods, the paper/cardboard can be coated only after the laser process, for example. In this way, there is then also again a barrier property for liquids or other filling products that require a UV or oxygen barrier in the scored region of the material of the paper and/or the other fiber-based web material.

Paper/cardboard/fiber webs are usually processed on roll cutting or winding systems.

Currently, the problem lies in that when the paper or the fiber web is scored from one side, the remaining uncut or non-scored part does not follow the scoring line when being torn open. The reason for this is that the paper is constructed in layers and the latter do not produce a clean edge when torn off.

A solution by the present invention can lie in that two scoring lines with a small spacing are incorporated on one side of the paper web. On the other side, a scoring line is then inserted between the two lines. Ideally, the scoring depths from both sides are in each case so deep that they cover the thickness of the paper in total. Thus, all transverse fibers of the paper are separated and not cut by the local separation.

If tearing-open is performed on the central scoring line, the tear profile follows the preferably three scoring line. In addition to the material properties, the edge quality is determined by the spacing between the scoring lines and the scoring depths.

By means of this method, the paper/fiber web remains very stable at tensile stresses that arise transversely to the scoring lines, such as on packaging machines. In addition to the material properties, the tensile stress is determined by the scoring depths and the spacing of the scoring lines.

The tear-off lines can be embodied so as to be linear or in any arbitrary shape.

When using a coated paper or fiber-based material, the single scoring line on the coated side is preferably used in order to influence the coating as little as possible. At the same time, the scoring depth can be selected very low on the coated side in order to produce the narrowest possible scoring line. For this purpose, the scoring depth is then selected to be greater on the other side in order to achieve the value of the material thickness.

BRIEF DESCRIPTION OF THE DRAWINGS

The present invention will be described in more detail hereunder with reference to the appended figures.

DETAILED DESCRIPTION OF THE INVENTION

Figure 1:
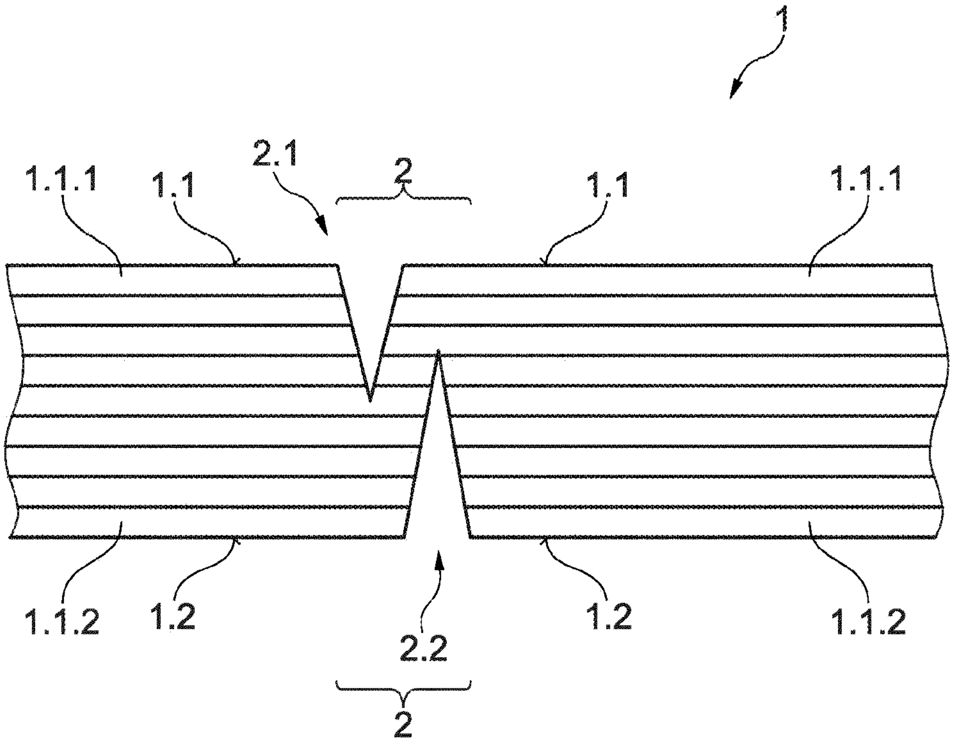
FIG. 1 shows a cross-sectional illustration of a paper or another fiber-based web material with scoring lines formed therein.

Accordingly, FIG. 1 shows a cross-sectional illustration of a paper 1, or another fiber-based web material 1, with scoring lines 2.1, 2.2 formed therein.

To produce a guided tear-open and/or tear-off aid 2 for the paper 1 and/or the other fiber-based web material 1, the paper 1 and/or the other fiber-based web material 1 is provided, in particular with ≥two fiber layers 1.1.1, 1.1.2.

At least two scoring lines 2.1; 2.2; are formed therein in at least one planar side 1.1; 1.2 of the paper 1 and/or the fiber-based web material 1, so that the scoring line 2.1; 2.2; 2.3 severs at least one fiber layer 1.1.1, 1.1.2.

The material of the paper 1 and/or the other fiber-based web material 1 for producing a scoring line is partially subtracted along the guided tear-open and/or tear-off aid 2 to be produced thereon at least from a planar side 1.1; 1.2 of the paper 1 and/or the fiber-based web material 1.

Thus, in this embodiment, two scoring lines 2.1 and 2.2, which are formed on the two mutually opposite planar sides 1.1 and 1.2 of the paper and/or the other fiber-based web material 1 form a first possible tear-open and/or tear-off aid 2.

Figure 2:
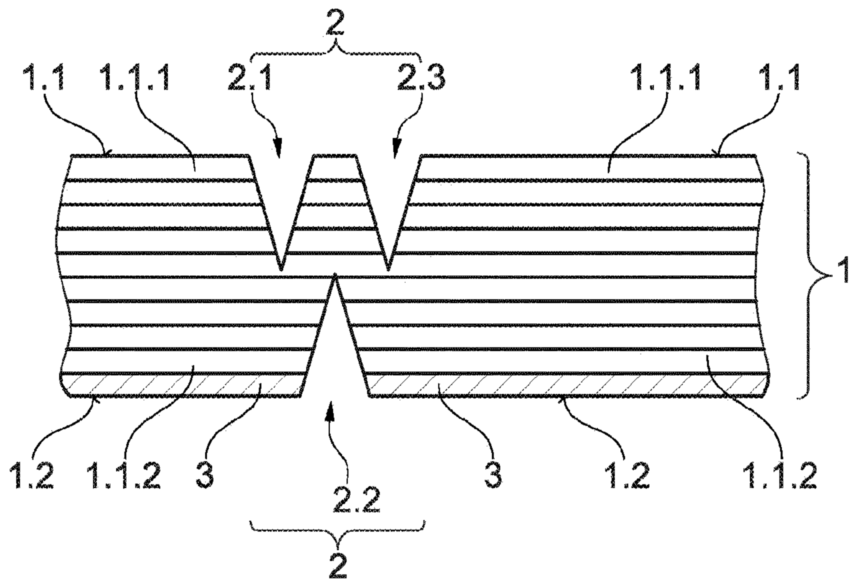
FIG. 2 shows an embodiment which is modified in comparison to FIG. 1.

Illustrated in FIG. 2 is an embodiment of a tear-open and/or tear-off aid 2 for the paper 1 and/or the other fiber-based web material 1, in which are formed on the planar side 1.1 two scoring lines 2.1 and 2.3, which are formed so as to be parallel to one another. Opposite these, a scoring line 1.2 is formed on the second planar side 1.2 of the paper 1 and/or the other fiber-based web material 1. By subtracting the respective material, both the first two scoring lines 2.1 and 2.3 and the third scoring line 2.2 are formed up to the same fiber layer in the depth of the web material. It is ensured as a result that when exerting a correspondingly large tensile and/or compressive effect on the paper 1 and/or the other fiber-based web material 1, the one tear-open and/or tear-off aid 2 tears off with a clean tearing edge.

The individual tear line 2.2 is formed on that side of the paper 1 and/or the other fiber-based web material 1 that is provided with a coating 3.

Figure 3:
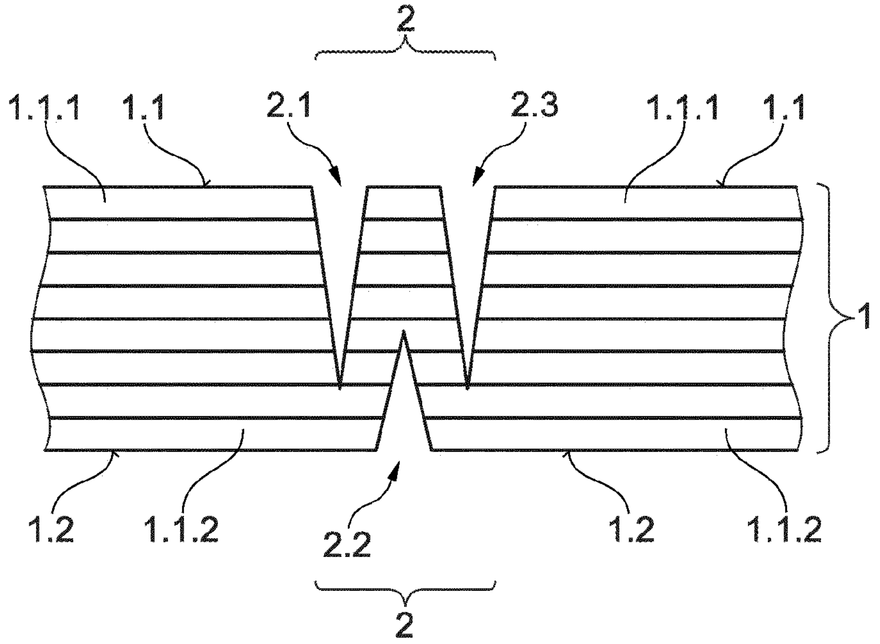
FIG. 3 shows a further embodiment which is modified in comparison to FIGS. 1 and 2.

FIG. 3 by way of example shows an embodiment, which is similar to that of FIG. 2, for additional potential embodiments. However, this is shown without a coating 3 (cf. FIG. 2). Furthermore, this embodiment differs from that of FIG. 2 in that the depths of the scoring lines 2.1, 2.2 and 2.3 in their overlap each have a greater extent than the thickness of the respective paper 1 and/or the other fiber-based web material 1. Due to the farther-reaching severance of the individual fibers of the paper 1 or web material 1, this causes an even less fringed and thus cleaner tear-off edge in comparison to the result in the embodiment according to FIG. 2.

Figure 4:
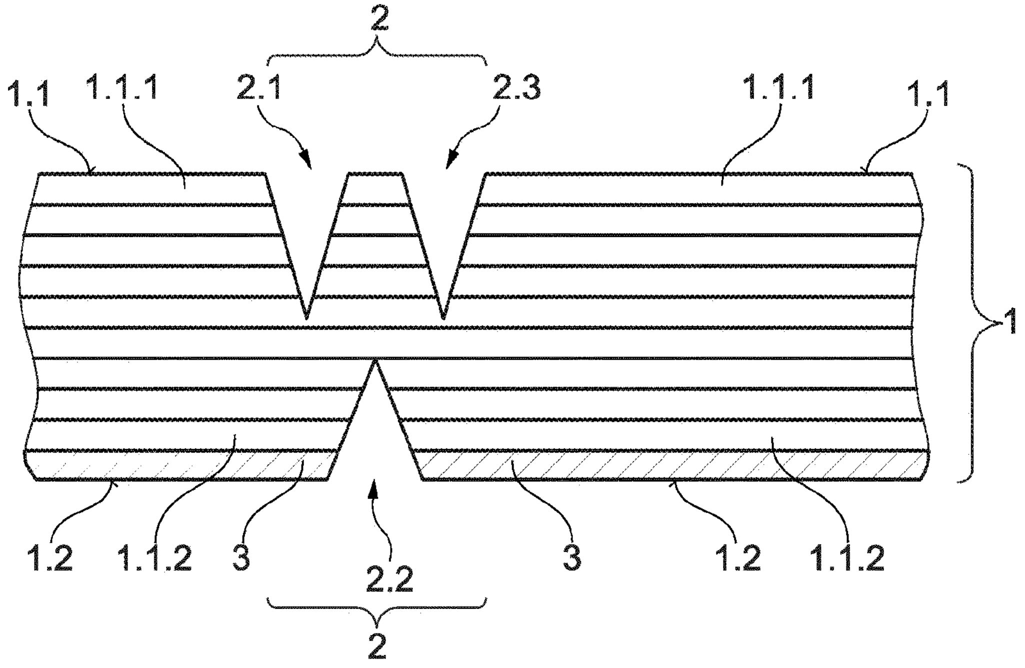
FIG. 4 shows a further embodiment which is modified in comparison to FIG. 2.

FIG. 4 shows, by way of example, an embodiment of a tear-open and/or tear-off aid 2 for the paper 1 and/or the other fiber-based web material 1 which is modified in comparison to FIG. 2 in as far that, when viewed in the cross section of the material of the paper 1 and/or of the other fiber-based web material 1, the additive tear depth is smaller than the material cross section. The additive tear depth is therefore less than 100% of the material thickness of the web material 1.

The tear depth depends on the fiber structure of the material. For example, in the case of short-fiber materials, tearing-off can result in a good tear-off edge even if there is no 100% overlap.

LIST OF REFERENCE SIGNS

- 1 Paper and/or other fiber-based web materials
- 1.1 Planar side of the paper
- 1.2 Planar side of the paper
- 1.1.1 Fiber layer,
- 1.1.2 Fiber layer
- 2 Tear-open and/or tear-off aid
- 2.1 Scoring line,
- 2.2 Scoring line,
- 2.3 Scoring line
- 3 Coating

The invention claimed is:

1. A method for producing a guided tear-open and/or tear-off aid for paper and/or other fiber-based web materials, comprising:

providing the paper and/or other fiber-based web material with at least two fiber layers, producing at least two scoring lines in at least one planar side of the fiber-based web material in such a way that the scoring line severs at least one fiber layer, wherein for producing the scoring lines, material is subtracted to form v-shaped grooves and the scoring lines are disposed on both planar sides of the paper and/or other fiber-based web material, wherein a planar side of the fiber-based web material has two adjacently extending scoring lines, and the spacing between the adjacently extending scoring lines is formed in a region with twice to ten times the scoring line width, and wherein the scoring lines are from both sides so deep that they cover the thickness of the paper and/or other fiber-based web material in total.

2. The method as claimed in claim 1, wherein the material of the paper and/or the other fiber-based web material for producing a scoring line is partially subtracted along the guided tear-open and/or tear-off aid to be produced thereon at least from one planar side of the paper and/or the fiber-based web material.

3. The method as claimed in claim 1, wherein the material of the paper and/or the other fiber-based web material, when viewed in the cross section of the paper and/or of the other fiber-based web material, is subtracted in a mutually offset manner along the guided tear-open and/or tear-off aid to be produced thereon from both planar sides of the paper and/or the other fiber-based web material.

4. The method as claimed in claim 1, wherein the two scoring lines of the at least one planar side of the paper and/or the other fiber-based web material are formed so as to be approximately parallel to one another.

5. The method as claimed in claim 3, wherein the one scoring line on the one planar side of the paper and/or the other fiber-based web material is formed so as to lie opposite and between the two scoring lines extending in the other planar side of the paper and/or the other fiber-based web material.

6. The method as claimed in claim 3, wherein, if the paper and/or the other fiber-based web material has a coating on one side, the single scoring line which is to be formed opposite the two scoring lines to be formed on a planar side of the paper and/or the other fiber-based web material is formed on the coated side, and/or the side to be coated after scoring, of the paper and/or the other fiber-based web material.

7. The method as claimed in claim 3, wherein the added scoring line depth of two scoring lines lying opposite and offset from one another is formed so as to be equal to or greater than the thickness of the paper and/or the other fiber-based web material.

8. The method as claimed in claim 1, wherein the scoring lines are produced by means of a LASER.

9. The fiber-based web materials, in particular packaging material, having a guided tear-open and/or tear-off aid for the paper and/or the other fiber-based web material, obtainable by a method as claimed in claim 1.

* * * * *